United States Patent
Chaudhry

(10) Patent No.: US 9,781,471 B1
(45) Date of Patent: Oct. 3, 2017

(54) METHOD AND APPARATUS FOR COMMUNICATING AND UPDATING LOGO IDENTIFIERS

(75) Inventor: Kapil Chaudhry, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 305 days.

(21) Appl. No.: 13/024,277

(22) Filed: Feb. 9, 2011

(51) Int. Cl.
H04N 5/445 (2011.01)
H04N 21/435 (2011.01)
H04N 21/4143 (2011.01)

(52) U.S. Cl.
CPC ....... H04N 21/435 (2013.01); H04N 21/4143 (2013.01)

(58) Field of Classification Search
CPC ............... H04N 21/235; H04N 21/435; H04N 21/4143; H04N 21/4383
USPC .......................... 725/32, 37, 86, 89, 94, 134
See application file for complete search history.

(56) References Cited

U.S. PATENT DOCUMENTS

| | | | |
|---|---|---|---|
| 7,599,710 B2 * | 10/2009 | Herberger et al. | 455/552.1 |
| 8,180,667 B1 * | 5/2012 | Baluja et al. | G06Q 30/0217 705/14.19 |
| 2004/0268400 A1 * | 12/2004 | Barde et al. | 725/94 |
| 2007/0139443 A1 * | 6/2007 | Marks et al. | 345/629 |
| 2009/0254778 A1 * | 10/2009 | Huang et al. | 714/38 |

* cited by examiner

Primary Examiner — Jivka Rabovianski
(74) Attorney, Agent, or Firm — Harness, Dickey & Pierce, PLC

(57) ABSTRACT

A method and system for processing logos includes a listing system assigning a logo address for a logo data file, storing the logo data file in a file server so that the logo data file is accessible by the logo address and storing the logo address in a database. The system includes a program guide module and a user device communicating a logo request signal to the program guide module. The program guide module communicates a logo return data signal including the logo address to the user device. The user device retrieves the logo graphics file from the file server using the logo address and displays a logo corresponding to the logo data file on a display associated therewith.

18 Claims, 3 Drawing Sheets

METHOD AND APPARATUS FOR COMMUNICATING AND UPDATING LOGO IDENTIFIERS

TECHNICAL FIELD

The present disclosure relates generally to communication systems, and more particularly, to a method and system for updating logo data for use in displaying program guide data.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Broadcast television channels and other internal programs are provided by the primary service provider. Another service provided by a primary service provider is providing program guide data which is used by a user device to display a grid guide on a display associated with the user device.

Television networks and channels are referred to herein below as networks. Each network may include a logo which is a graphical file that is associated with the network. A logo may be displayed adjacent to a listing for the particular network at a particular program time within the program guide. On Demand and other types of pay-per-view systems may also include a logo graphic. Logos evolve and change over time.

Logos are typically communicated as part of the data for program guide services. Once the logos were communicated to a set top box, they remain relatively fixed. Because service providers are continually providing different services, some logo files may not be appropriate for display on different devices. For example, a set top box with a television may include a high resolution logo whereas the same high resolution logo may not be for being displayed on a smart phone or other type of device with a smaller screen display.

SUMMARY

The present disclosure provides a system for providing current logos that are suitable for display on the device. That is, the logo file has an appropriate size and background for the requesting user device.

In one aspect of the disclosure, a method includes assigning a logo address for a logo data file and storing the logo data file in a file server so that the logo data file is accessible by the logo address, storing the logo address in a listing database. The method also includes communicating a logo request signal to a program guide module at the user device. Further, the method includes communicating a logo return data signal including the logo address to the user device n response to the logo request signal, retrieving the logo graphics file from the file server using the logo address and displaying a logo corresponding to the logo data file on a display of the user device.

In a further aspect of the disclosure, a method generating a plurality of logo data files for a logo for different device types for a broadcast network, assigning a respective logo address for each of the logo graphics files, storing the logo graphics files in a file server accessible using the respective logo address, storing the respective logo addresses in a database, at a user device, communicating a logo request signal from a program guide module using a logo request signal including a device type identifier, communicating a logo return data signal including the respective logo address for a logo data file corresponding to the device type identifier from the database, communicating logo return data signal including the logo address for the user device type to the user device in response to the request signal, retrieving the logo data file from the file server using the logo address and displaying a logo corresponding to the logo data file on a display of the user device.

In another aspect of the disclosure, a system includes a listing system assigning a logo address for a logo data file, storing the logo data file in a file server so that the logo data file is accessible by the logo address and storing the logo address in a database. The system includes a program guide module and a user device communicating a logo request signal to the program guide module. The program guide module communicates a logo return data signal including the logo address to the user device. The user device retrieves the logo graphics file from the file server using the logo address and displays a logo corresponding to the logo data file on a display associated therewith.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
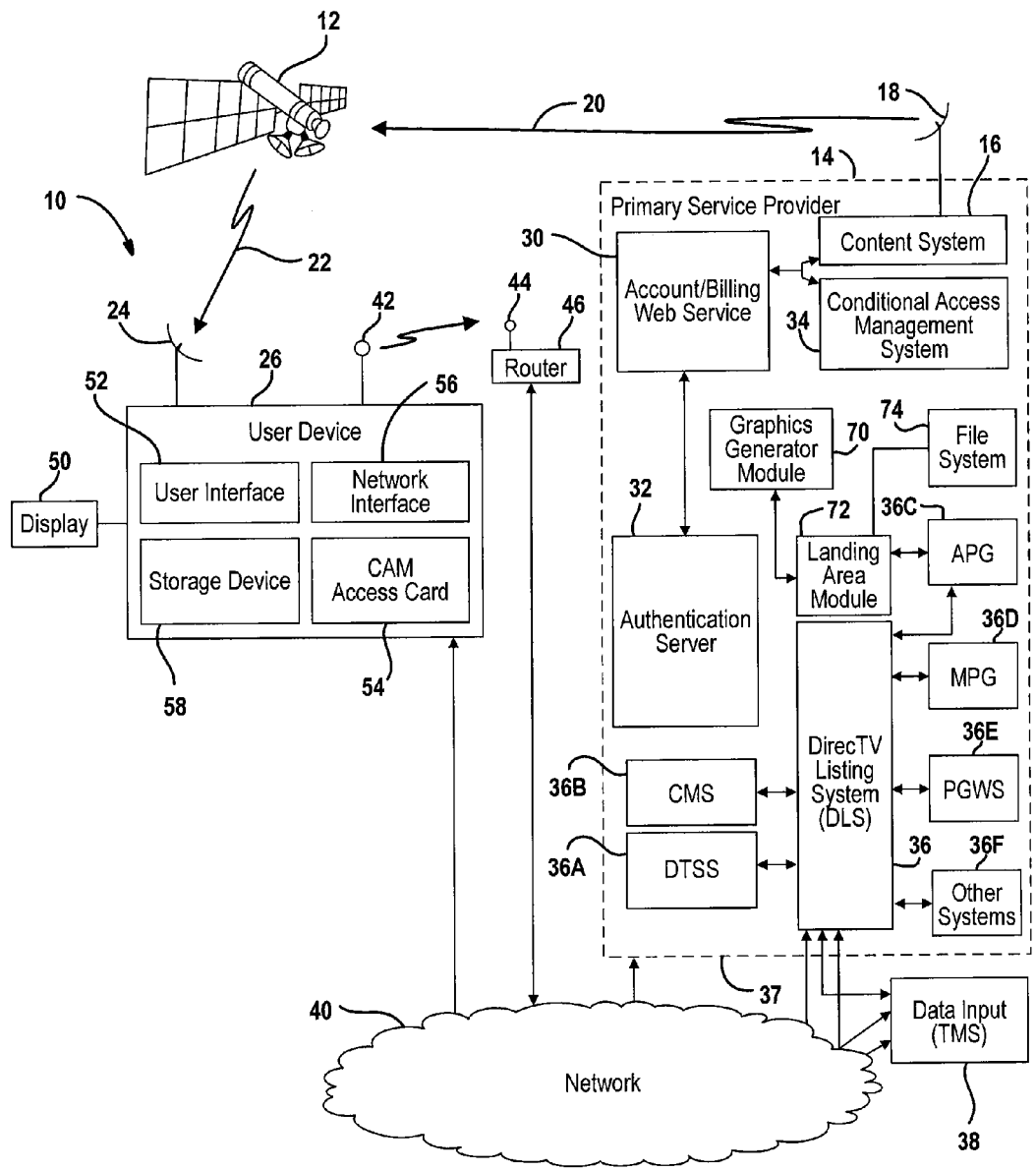
FIG. 1 is a block diagrammatic view of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcast system 10 is illustrated. The satellite television broadcast system 10 is illustrated by way of example. However, the present disclosure is not so limited as mentioned above. The television broadcast system 10 includes a satellite 12 that receives content or programming from a primary service provider 14.

The primary service provider 14 includes a content system 16 that generates uplink signals 20 corresponding to content through an uplink antenna 18. As mentioned above the content may be various types of content including but not limited to live content, recorded content, pay-per-view content and on-demand content. The uplink signals 20 may be television signals and more specifically digital television signals. The uplink signals 20 may also be data including but not limited to interactive television data and program guide data. The uplink antenna 18 communicates the uplink signals 20 to the satellite 12 which in turn generates downlink signals 22. The downlink signals 22 are communicated to a receiving antenna 24 of a user device 26. Although only one user device 26 is illustrated, several user devices may be provided in the system 10. The uplink signals 20 and downlink signals 22 may be referred to as communication signals. Communication signals are wireless communication signals and may include various types of entertainment content, data, traffic, weather, hazardous material warnings, advertising material, guide data and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices may be used such as a cable television set top box. Other types of user devices may also include a mobile device such as a lap top computer, cellular phone, personal digital assistant, a portable media player or an automotive-based television receiving device. Thus, the user device 26 may be a fixed user device in the case of a satellite television set top box or a mobile user device. Both fixed and mobile devices may be used in a system.

The primary service provider 14 may also include an account/billing web service 30 and an authentication server 32. The authentication server 32 may include an authentication server for generating and validating user devices using eTokens or other processes.

The primary service provider 14 may also include a conditional access management system 34. The conditional access management system 34 may be used to grant conditional access to various programming as well as provide recording commands to the user device 26 as will be described below.

The primary service provider 14 may also include a DIRECTV® listing system (DLS) 36. The listing system 36 may be in communication with a DIRECTV® traffic and scheduling system (DTSS) 36A. The DTSS 36A may provide program schedule data and channel data for the program content.

The DLS 36 may also be in communication with a content management system (CMS) 36B. The CMS 36B may provide metadata regarding programming content to the DLS 36.

The listing system 36 may also be in communication with an advanced program guide module 36C, a program guide generator 36D, a program guide web service 36E and other systems 36F. The interaction of the DIRECTV® listing system 36 and the various modules 36A-36F will be further described below. In summary, the listing system 36 receives various data from the various systems which may be used to generate program guide data.

An external data input 38, such as Times Media Service (TMS), may be used for receiving various data regarding programming. Times Media Service is just one example of an external data service. The external data input 38 may provide channels, programs and schedules as an input to the listing system 36. The external data input 38 may provide various types and formats of data and images such as posters for content and data regarding the program content or actors therein. A data stream may be provided with various types of information regarding programming.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40.

The network 40 may also be an intranet. The components of both the primary and partner service provider may be located separately or in the same building.

The user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

The primary service provider 14 may also include a graphics generator module 70. The graphics generator module 70 may be used to generate graphic logos (logo data files) for the various networks. Multiple graphics files may be generated for a particular network. The logo files may be grouped together in a compressed format such as a zip format for transmission. Different logos for different size screen displays may be generated. For example, set top boxes may have a relatively large or high resolution symbol used for a particular network. A cellular phone or other personal computing device may require a different size or color background logo. The size of the display may dictate the size of the logo and thus the particular logo file to be used by the screen display.

The logo files are ultimately communicated to the DIRECTV® listing system (DLS) 36. The DLS 36 may receive graphics files through a landing area module 72 as will be further described below. The landing area module 72 may be an intermediate storage device that is in communication with a file system 74. The file system 74 may store the logo files therein. As mentioned above, multiple logo files may be provided with different storage addresses so that they may be externally retrieved. This process will be further described below.

It should be noted that the graphic generator module 70 is shown as included within the primary service provider. The graphics logo file may be generated outside of the primary service provider 14 and communicated to the primary service provider or the landing area module 72. One possible configuration is that the external data input 38 may provide the graphic logo files.

Figure 2:
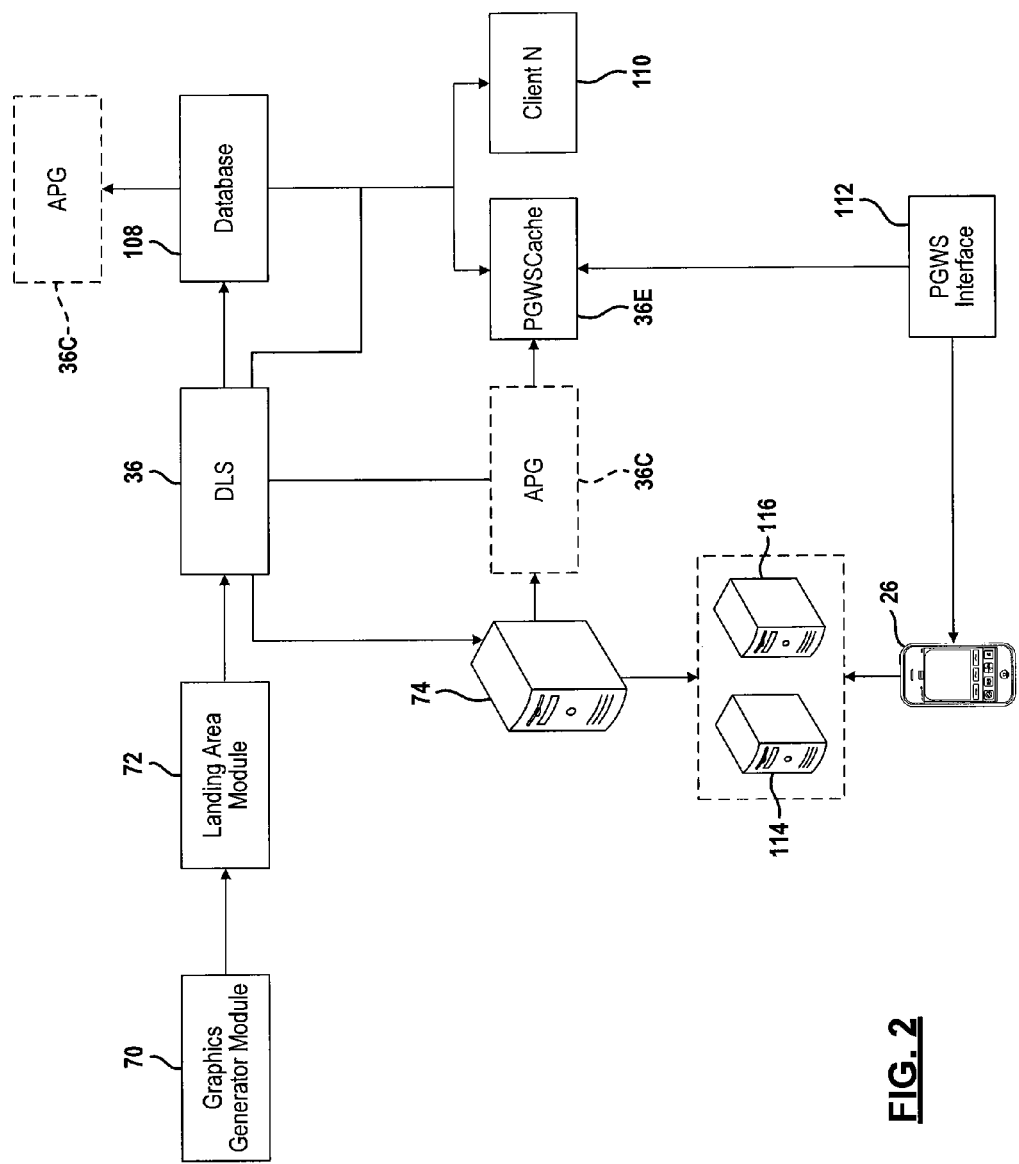
FIG. 2 is a detailed block diagrammatic view of a logo system according to the present disclosure.

Referring now to FIG. 2, a detailed block diagrammatic view of the system for processing logo data files is set forth. The graphics generator module 70 is used for generating logo data files.

The logo graphics data within the logo data files may be renderable by the various devices. Bit maps and other suitable formats may be used. The logo data files may be generated within the graphics module or may be imported from external web services such as the data input 38 illustrated in FIG. 1. When a new logo is available for a particular network, a new or updated logo file is generated in a predetermined format and a delete logo file signal is generated so that the old logo may be deleted for logos that are being updated. The logo data or graphics files may have a device type associated therewith so that the type of device can ultimately be linked with the proper logo file. As will be described below, different logo sizes and backgrounds may be provided for different types of devices. For example, some devices may have a large display and thus a more detailed logo graphic may be provided. Some devices may have a small display and thus a less detailed logo graphic file may be provided. The backgrounds may vary. In this example, white and transparent backgrounds may be used.

The logo data or graphics files and the metadata associated therewith may be communicated to the landing area module 72. As mentioned above, this may be in a compressed or zipped format. The landing area module 72 may generate a notification or ticket that communicates to the DLS 36 that a new logo file and metadata are available. The DLS 36 may poll the landing area module 72 at a regular time interval such as once a day or twice a day for any new available logos. By recognizing the ticket in the landing area, the DLS recognizes that a new logo file is available.

The DLS 36 may unzip the logo file to retrieve the various logo files and metadata. After unzipping the files the DLS 36 may delete any old files in the shared file system 74 and store the new logo files therein. A record is made for the address associated with each of the logo files. The address will allow external devices to ultimately retrieve the logo files corresponding to the particular file device type. The address may be a uniform resource locator (URL) address.

A listing database 108 receives the new, modified or updated feed from the DLS 36. The database entries are thus updated or newly created when a new logo file is available. The database 108 stores the address which may be a universal resource locator address for the logo files within the file system 74. A separate database entry and separate address may be saved for each of the logos for each of the different devices.

The program guide system 36 may be in communication with the database 108. The contents of the listing database may be broadcasted to various user devices such as a set top box. The set top box may use the address stored in the database to retrieve the logo files.

The program guide system 36C is also illustrated in another location to represent that the program guide system 36C may retrieve the logo files from the file system 74 for communication to the user devices.

The DLS 36 may be in communication with the program guide web service cache 36E. The program guide web service cache 36E stores various data and interacts with the program guide web service interface (PGWS) 112. Of course, other types of systems may also interface with the listing service 36 as illustrated by client N 110.

When data is requested from the program guide web service 36E, the program guide web service interface 112 receives a request signal from a user device 26. The interface 112 in this example is a mobile device interface. However, various other device type interfaces may be used. The request from the user device 26 may be made in conjunction with a request for program guide data. The request data signal may include an electronic token (eToken) that is generated by the authentication server 32 illustrated in FIG. 1. Likewise, further security may be provided by using a signature. A site identifier may also be included in the request data signal. The site identifier may be used when the user device 26 is contacting the primary service provider 14 through another service.

A device type may also be communicated from the user device 26. The device type 26 may provide an indication of the type of device or the size of the display associated with the device. The logo background color may also be requested in the request data signal. Further, the date and time that the last logo file was updated may also be included.

In response to the request data signal, the program guide web service cache 36E through the listing service 36 may retrieve the proper address and metadata corresponding to the logo data. A logo return data signal may include a device type identifier, a logo background color, a date and time the logo was last updated, a logo index identifier, an address for the appropriate logo file within the file system 74 and the dimensions for the logo. The logo return data may be communicated through the PGWS cache 36E and the PGWS interface 112 to the user device 26. The user device 26 may then request the logo file from the file system 74 through one of the servers 114, 116. The servers 114, 116 may be various types of servers including a post-office protocol (POP) server. The servers 114, 116 may use a file transfer protocol or rsync protocol to retrieve the logo file corresponding to the logo address from the logo return data signal. The logo data file may be retrieved from the file system 74 using the address from the logo return data signal. A logo data file may be communicated through the servers 114, 116 back to the user device 26. The user device 26 may then display the logo file in the appropriate location indicated by the program guide data.

Figure 3:
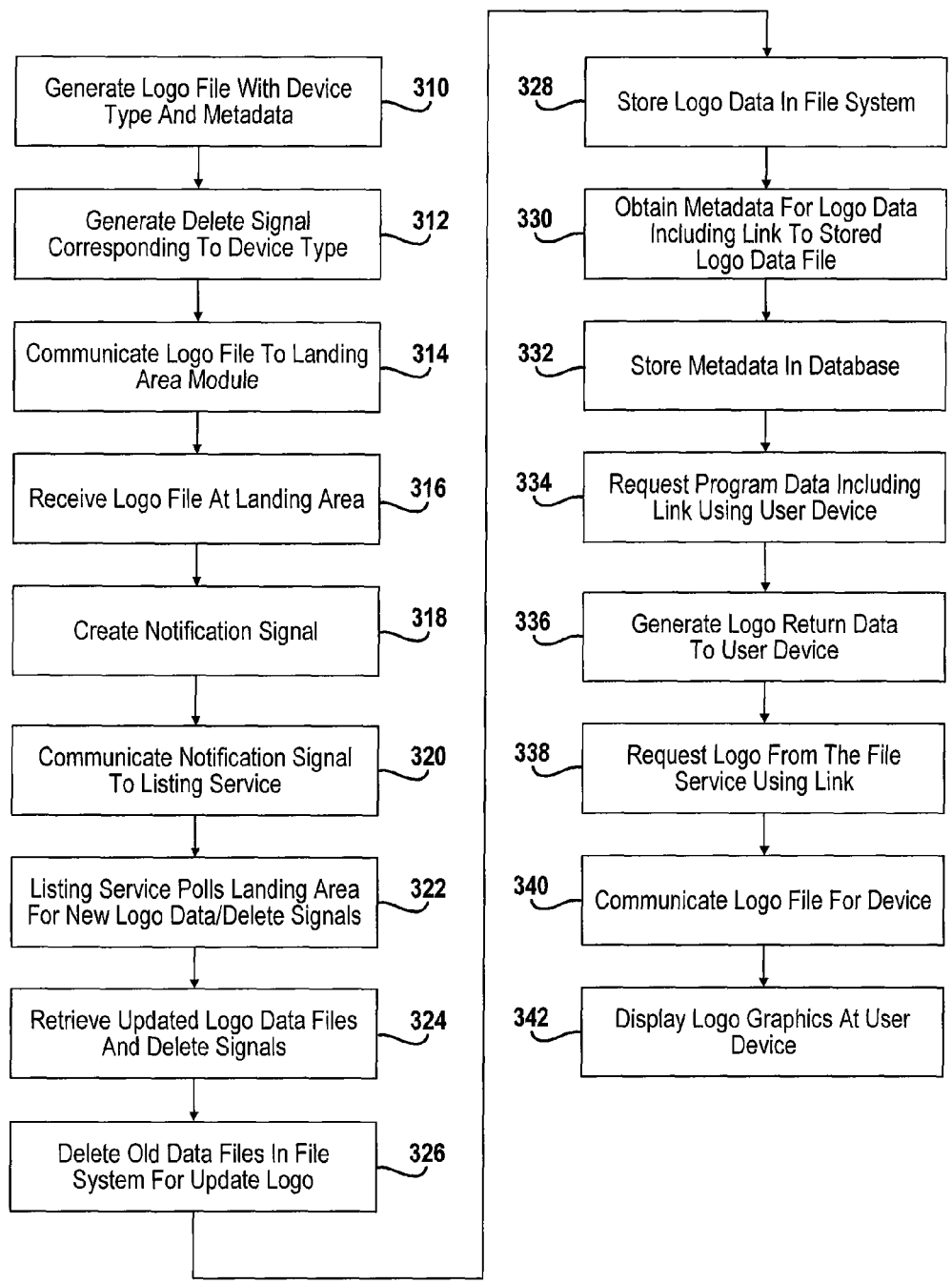
FIG. 3 is a flowchart of a method for processing logos files.

Referring now to FIG. 3, the method for processing and using the logo files is set forth. In step 310, a logo file is generated corresponding to a device type. The device type may be included in metadata as illustrated in step 310. In step 312, a delete signal corresponding to the device type may also be generated when the logo file is generated. Ultimately, the delete signal may be used for deleting the old logo data files from the file server and deleting the database record.

In step 314, the logo file is communicated to the landing area 72 illustrated in FIG. 2. In step 316, the landing area receives the logo file for temporary holding. The logo file may be communicated to the DIRECTV® listing service 36 illustrated in FIGS. 1 and 2 in various ways. In this example, a notification signal is created at the landing area in step 318. In step 320, the notification signal is communicating to the listing service 36. The listing service may poll the landing area for new logo data and delete signals. In step 324, the updated logo files and delete signals may be retrieved from the landing area. In step 326, the old data files in the database and the file system may be deleted when the system is updating a logo. This step may not be performed when a new logo is added to the system.

In step 328, the updated logo data may be stored in the file system. In step 330, metadata for the logo including a link to the stored data file may be generated. Each logo file may be stored at a particular location within the file server 74. Thus, a unique address is associated with each logo file. Each logo file may correspond to a particular device type and a particular broadcast network. One broadcast network may have various numbers of logos corresponding to various devices having various screen sizes. Generally the same logo may be represented in various pixel sizes, background colors and the like. The metadata associated with the logo files is stored in the database 108 illustrated in FIG. 2. The metadata may include a device type, a background type such as white or transparent, a dimension of the logo, a last updated date, and other information suitable for the logo. The metadata is stored in the database in step 332.

In step 334, a request for program data that may include a request data signal for a logo may be generated in step 334. The request may include an eToken, a signature, a site identifier, a site user identifier, a device type identifier, a background identifier and a last updated time identifier each of which is mentioned above. After step 334, a logo return data signal is returned through the program guide system to the user device. The user device may ultimately receive the data from the database 108 of FIG. 2. In step 338, the user device may request the logo from the file server using the address or link that was received in the logo return data signal. In step 340, the logo may be communicated from the file server to the user device. In step 342, the logo may be displayed at the user device. The logo may have a predetermined location adjacent to a channel number or other type of channel identifier.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    generating a plurality of logo graphics files for a logo, each of the plurality of logo graphics file corresponding to a different device type;
    assigning a respective logo address for each of the plurality of logo graphics files;
    storing the plurality of logo graphics files in a file server accessible using the respective logo address;
    storing logo metadata for each of the plurality of logo graphics files in the file server;
    storing respective logo addresses for the plurality of logo graphics files in a database;
    at a user device having a user device type, wherein the user device is separate from the file server, communicating a logo request signal comprising a device type identifier corresponding to the device type;
    communicating a logo return data signal including the respective logo address and metadata for a respective logo graphics file corresponding to the device type identifier from the database to the user device;
    requesting, by the user device, the respective logo graphics file from the file server using the respective logo address through a network;
    communicating the respective logo graphics file to the user device from the file server through the network in response to requesting;
    receiving the logo data file at the user device; and
    after receiving, displaying the logo corresponding to the logo data file on a display of the user device.

2. A method as recited in claim 1 further comprising communicating the logo data file to a landing area prior to assigning.

3. A method as recited in claim 2 further comprising polling the landing area from a listing server.

4. A method as recited in claim 3 wherein polling comprises polling the landing module on a regular time interval.

5. A system as recited in claim 2 wherein the plurality of logo graphics files have at least one of a different size or background color.

6. A method as recited in claim 1 wherein generating a logo request signal comprises generating the logo request signal comprising a logo background color.

7. A method as recited in claim 1 wherein the user device comprises a mobile device.

8. A method as recited in claim 1 wherein the user device comprises a set top box.

9. A method as recited in claim 1 wherein assigning the respective logo address comprises assigning the respective logo address corresponding to a broadcast network.

10. A method as recited in claim 1 further comprising forming the database as a listing database from guide channel data, broadcast network data, schedule data, program data and the logo address; and communicating listing data from the listing database to the program guide module.

11. A method as recited in claim 1 wherein the plurality of logo graphics files have at least one of a different size or background color.

12. A logo system comprising:

a listing system assigning a respective logo address for each of a plurality of logo graphics files for a logo, each of which corresponds to a different device type, storing the plurality of logo graphics files in a file server so that the plurality of logo graphics files is accessible by the respective logo address and storing the logo address in a database;

a program guide module; and a user device having a user device type, wherein the user device is separate from the file server and communicates a logo request signal comprising a device type identifier corresponding to the device type to the program guide module;

said program guide module communicating a logo return data signal including the respective logo address and metadata for a respective logo graphics file corresponding to the device type identifier to the user device in response to the logo request signal and the device type identifier;

said user device requesting the respective logo graphics file from the file server using the logo address through a network and displaying a logo corresponding to the logo data file on a display associated therewith.

13. A system as recited in claim 12 further comprising a landing area receiving the logo graphics files.

14. A system as recited in claim 13 wherein the listing system polls the landing area for the logo data file.

15. A system as recited in claim 14 wherein the logo request comprises a background color.

16. A system as recited in claim 14 wherein the user device comprises a mobile device.

17. A system as recited in claim 14 wherein the user device comprises a set top box.

18. A system as recited in claim 14 wherein the logo data file corresponds to a broadcast network.

\* \* \* \* \*